2,678,420

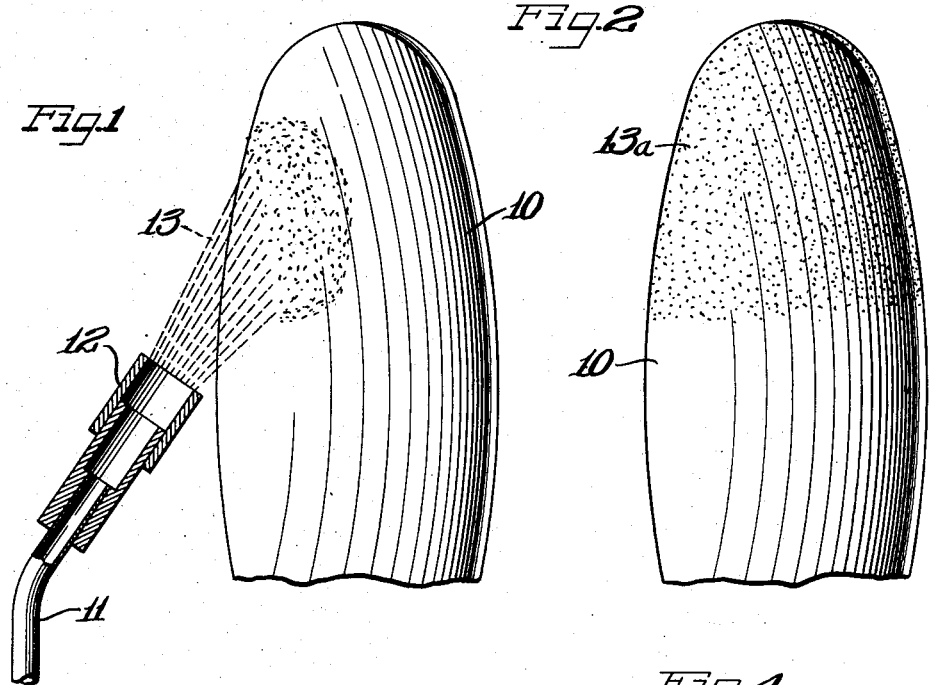
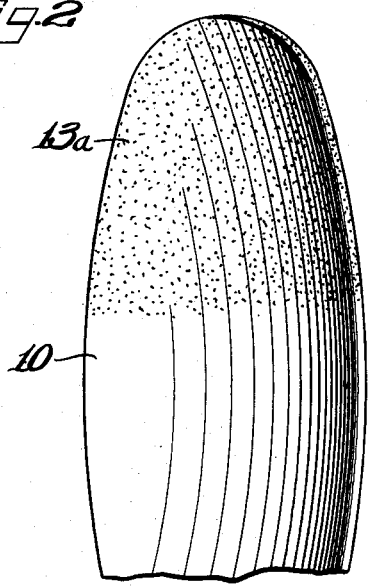
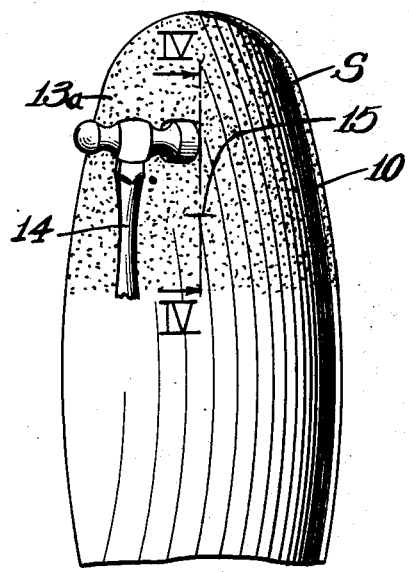
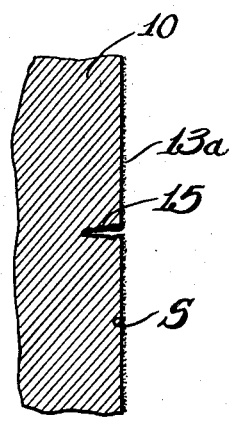
Inventors:
Taber deForest
Henry N. Staats Patented May 11, 1954

UNITED STATES PATENT OFFICE 2,678,420

METHOD OF DETECTING FLAWS

Taber de Forest, Northbrook, and Henry N. Staats, Des Plaines, Ill., assignors to Magnaflux Corporation, Chicago, Ill., a corporation of Delaware Application June 28, 1951, Serial No. 233,996

5 Claims. (Cl. 324—32)

1

This invention relates to a method of detecting surface discontinuities, flaws, cracks and the like in rigid materials, and particularly those flaws and cracks that are not readily apparent to the naked eye or capable of easy detection. In many instances, the surface discontinuities are due to fatigue strains.

In accordance with the method of our present invention, a uniform coating of fine, discrete particles is first applied to the rigid article to be tested. Preferably, the particles are electrostatically charged in the manner described in our Patent No. 2,515,396 and are sprayed or blown against the surface of the test piece so as to provide a thin, uniform, dust-like coating over that part of the surface that is to be inspected. It is, however, possible to apply the powder in the form of a liquid suspension using a readily volatile liquid medium, such as alcohol, or the like, and either spraying the suspension onto the surface or dipping the piece to be tested into the suspension, then removing and drying. Thereafter, the part to be tested is subjected to shock, so as to dislodge the powder at the location of any crack by reason of the differential motion set up at the edges of the crack, or flaw. Alternatively, the part to be tested may be subjected to bending and if there is any sudden development of cracks, they will become apparent by the dislodgment of the powder at the edges of the crack.

It is therefore an important object of this invention to provide a method of detecting surface discontinuities in rigid articles by applying to the surface thereof finely divided, discrete particles that adhere lightly to the surface to be tested as a fine, dust-like coating, and then subjecting each surface to shock, impact or vibrations sufficient to cause a dislodgment of the powder coating at the crack, or flaw.

It is a further object of this invention to provide a method whereby a contrast is effected between the surface, or background, of the article to be tested, the testing material, and the locations at which surface discontinuities are present.

Other and further important objects of this invention will be apparent from the disclosures in the specification and the accompanying drawings.

As shown on the drawings:

Figure 1 is a fragmentary elevational view of a piece to be tested, such as a propeller blade, illustrating the application of electrostatically charged particles to the surface of the article to be tested.

Figure 2 is a view similar to Figure 1 showing

2 the dust-like coating of powder formed on the propeller blade.

Figure 3 is a fragmentary elevational view illustrating the application of a shock to the article being tested and showing the location of a surface discontinuity.

Figure 4 is an enlarged fragmentary sectional view taken along the line IV—IV of Figure 3.

As illustrated in the drawings, the article to be tested may be a propeller 10, which is to be inspected for fatigue cracks, or the like. Our method, however, is applicable to any rigid articles, whether metal or non-metal, and whether electrically conductive or electrically non-conductive, such as a dielectric, plastic body or the like.

In the first step of our method, the article 10 is preferably coated with a thin layer of finely divided, discrete particles, the coating being uniformly applied over that portion of the surface that is to be inspected. The coating operation may suitably be carried out using the apparatus and method described in our Patent No. 2,515,396. As illustrated in Figure 1, finely divided powder, from a source of supply (not shown), is conducted through a flexible tubing 11 and discharged through a dielectric nozzle 12 in the form of a gaseous suspension, or stream 13, that is directed toward the surface of the article 10. If the article 10 is electrically conductive, the particles adhere more readily to the surface, but they will also adhere to a dielectric surface sufficiently well to form a uniform, thin coating, as indicated at 13a (Fig. 2).

In the next step of our method, the article 10 is subjected to a sudden impact, or shock, as by means of a hammer 14. The blow of the hammer is struck at a point relatively remote from the surface that is to be inspected so as to set up a vibration in said surface, indicated in Figure 3 by the reference character S, of sufficient intensity to dislodge the particles at any crack, such as the crack 15, but of insufficient intensity to dislodge the particles other than at a crack. Said surface S, prior to the application of the blow by the hammer 14, is provided with a uniform, thin coating of powder 13a, but if there is a surface discontinuity within the area S, it will show up as a visible crack, indicated by the reference numeral 15, due to the dislodgment of the particles at the edges of the crack because of the differential motion set up by the vibration in the article. The crack is visibly observable by the operator, so that its location and extent can be noted.

In order to heighten the contrast between the powder coating 13a and the portion of the article 10 showing through the crack 15, the powder may be variously colored, or may be fluorescent, or the surface or background of the article 10 may be colored, as by painting, either with a non-fluorescent or a fluorescent pigment, or dye which is colored in contrast to the electrostatically charged powder. In painting a pigment onto the surface before application of the powder, it is preferable to apply the pigment in an alcohol suspension and let the alcohol evaporate.

Instead of applying the shock by means of a blow, vibrations may be set up in the article undergoing testing by drawing a bow, file, or any other instrument capable of setting up mechanical vibrations in the article, or by placing the article on a shake-table. Alternately, the article may be subjected to ultrasonic vibrations, or waves, to induce vibrations in the article itself. For this purpose a magnetostrictive oscillator may be used.

Instead of applying the powder in a gaseous stream, the powder may be suspended in a volatile liquid, such as alcohol, and the article dipped or immersed in the liquid, or the liquid sprayed or otherwise applied to the surface of the article, after which the liquid medium is allowed to evaporate to leave a thin, uniform coating of the powder over the surface to be tested. The article is then subjected to a shock, or caused to vibrate, in the manner already described.

Where porcelain enameled articles, or other articles having a brittle coating, are to be tested to determine whether they can be bent to the required extent without cracking, powder is first applied to the surface of the porcelain enameled article in sheet form, and the sheet then bent to the required amount. If cracks suddenly occur, in the brittle enamel coating, the powder will be dislodged at the edges of the crack and the formation of the crack thus made visible to the operator.

The powder that we have found most suitable for application to the body undergoing testing to form the dust-like layer 13a, is calcium carbonate, or precipitated chalk, in a state of subdivision such that the majority of the particles are less than 10 microns in maximum dimension, and preferably between 1 and 5 microns. Instead of precipitated chalk, other mineral powders, such as talc, powdered mica, diatomaceous earth, kaolin, calcium sulphate, or iron oxide may be used, or it is possible to use carbon black, aluminum powder and the like.

In the case of rigid articles that have been shot peened, it is possible to find cracks in residual compression. Also, it is possible to find cracks that are contaminated by foreign matter, as for example, engine parts contaminated with carbon deposits. The method used in testing is the same as that already described.

We claim as our invention:

1. The method of detecting surface discontinuities, flaws, fatigue cracks and the like in an article, which comprises applying to the article a uniform coating of electrostatically charged, fine, discrete particles, subjecting the thus coated article to shock sufficient to dislodge said particles at the location of any flaw but insufficient to dislodge said particles other than at flaw locations and observing the presence and extent of any such location at which the particle coating is discontinuous.

2. The method of detecting surface discontinuities, flaws, fatigue cracks and the like in an article, which comprises blowing against the surface of an article to be tested a gaseous stream of electrostatically charged, fine discrete particles to form a thin dust-like coating thereover, vibrating said article to dislodge said particles at the location of a surface discontinuity and observing the presence and extent of any such location at which the particles have been dislodged.

3. The method of detecting surface discontinuities, flaws, fatigue cracks and the like in an article, which comprises blowing against the surface of an article to be tested a gaseous stream of electrostatically charged, fine, discrete particles of a color contrasting with the color of said surface to form a thin dust-like coating thereover, subjecting said article to a shock to dislodge said particles at the location of a surface discontinuity and observing the presence and extent of any such location at which the particles have been dislodged.

4. The method of detecting surface discontinuities in an article, which comprises blowing against the surface of said article a gas-suspended stream of electrostatically charged particles of less than 10 microns in maximum dimension, subjecting said article to shock to dislodge said particles by differential motion at the edges of any surface discontinuity present, discontinuing the subjection of said article to shock and observing the presence of the particles on said surface.

5. In the method of detecting surface discontinuities in an article having a brittle coating, the steps of applying to the surface of such coating a lightly adhering dust-like coating of electrostatically charged fine particles of a color contrasting with the color of said brittle coating, bending said article until cracks are suddenly developed in said brittle coating and observing the dislodgement of said particles at the location of said cracks.

References Cited in the file of this patent

UNITED STATES PATENTS

| Number | Name | Date |
|---|---|---|
| 2,186,014 | Ellis | Jan. 9, 1940 |
| 2,294,897 | Ellis | Sept. 8, 1942 |
| 2,499,466 | De Forest et al. | Mar. 7, 1950 |
| 2,515,396 | De Forest et al. | July 18, 1950 |

FOREIGN PATENTS

| Number | Country | Date |
|---|---|---|
| 692,051 | Germany | June 11, 1940 |